United States Patent [19]
Murdock

[11] 3,906,391
[45] Sept. 16, 1975

[54] LINEAR PERIOD THERMISTOR TEMPERATURE OSCILLATOR

[75] Inventor: Lawrence C. Murdock, Bellevue, Wash.

[73] Assignee: Westinghouse Electric Corporation, Pittsburgh, Pa.

[22] Filed: June 14, 1974

[21] Appl. No.: 479,390

[52] U.S. Cl.......... 331/66; 73/362 AR; 331/108 D; 331/143; 331/177 R
[51] Int. Cl.².................... G01K 7/24; H03K 3/02
[58] Field of Search .......... 331/65, 66, 108 D, 141, 331/143, 144, 176, 177 R; 73/362 AR

[56] References Cited
UNITED STATES PATENTS

| | | | |
|---|---|---|---|
| 3,360,746 | 12/1967 | Weidknecht | 331/176 X |
| 3,656,066 | 4/1972 | Reynal | 331/65 |
| 3,713,046 | 1/1973 | Wong et al. | 331/108 D X |
| 3,745,420 | 7/1973 | Häfner | 331/177 R X |

*Primary Examiner*—Siegfried H. Grimm
*Attorney, Agent, or Firm*—D. Schron

[57] ABSTRACT

An oscillator circuit which converts the resistance variation with temperature of a non-linear thermistor into a variation in the period of an oscillator which is linear with temperature.

4 Claims, 5 Drawing Figures

LINEAR PERIOD THERMISTOR TEMPERATURE OSCILLATOR

BACKGROUND OF THE INVENTION

1. Field of the Invention

The invention in general relates to the measurement of temperature, and particularly to apparatus which converts the measurement into a corresponding frequency.

2. Description of the Prior Art

A commonly used transducer for the measurement of temperature is the thermistor. It is relatively inexpensive, reasonably stable, and possesses a high temperature coefficient of resistance which, however, is very non-linear. Frequently, it is desired to convert the temperature indication into a variation in the frequency or period of an oscillator in order to facilitate the transmission of the information to a remote location. The conversion at the receiving end is made by counting high frequency clock pulses over one or more periods of the received signal. It is desirable under these circumstances to provide a signal, the period of which is a linear function of temperature even though the thermistor characteristics vary non-linearly with temperature.

SUMMARY OF THE INVENTION

The oscillator of the present invention does provide an oscillator output which is linear with temperature. The circuit which accomplishes this is a relatively low cost, low power circuit with long-term stability. The output remains linear independent of power supply variations and independent of ambient temperature. The circuit includes an operational amplifier which provides an output signal which switches between positive and negative output values depending upon the magnitude of signals applied to first and second inputs. The output of the amplifier is connected to one input of the amplifier by way of a first feedback path including an integrator circuit and is connected to the second input by means of a second feedback path including a temperature sensor which exhibits a non-linear resistance change with temperature.

DESCRIPTION OF THE PREFERRED EMBODIMENT

Figure 1:
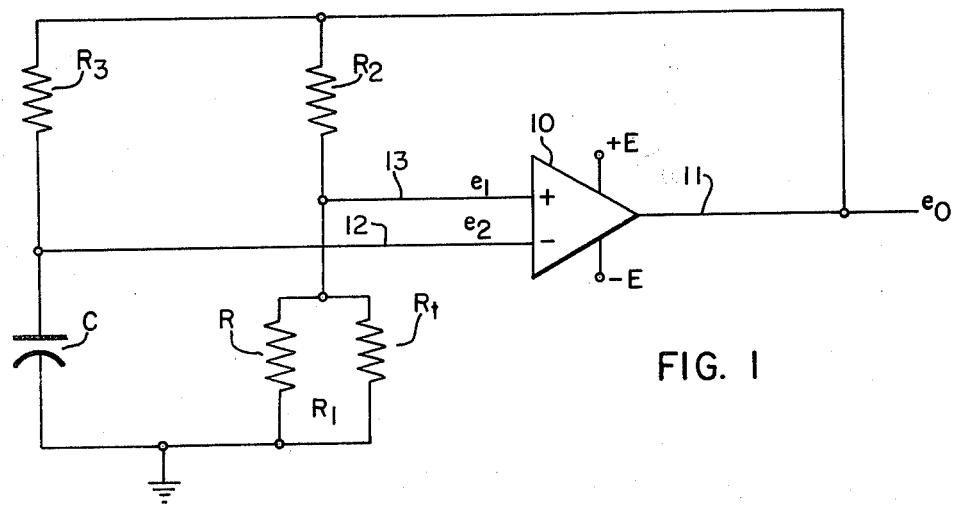
FIG. 1 illustrates a preferred embodiment of the present invention.

The oscillator of the present invention is illustrated in FIG. 1 and includes a differential amplifier 10 having an output 11 and first and second inputs 12 and 13, input 12 being the negative or inverting input, and input 13 being the positive or noninverting input. The power supply connections for the amplifier 10 are illustrated as being for connection to a positive power source designated +E and a negative source −E.

Output 11 is connected to the first input 12 by means of a first feedback path which includes an integrator circuit made up of a resistor $R_3$ and a capacitor C. The first input 12 is connected to the junction between these two components such that the inverting input receives a signal $e_2$ which is the integral of the output signal $e_0$.

The output 11 is additionally connected to the second input 13 by way of a second feedback path which includes the serial arrangement of resistors $R_2$ and $R_1$ forming a voltage divider network with the noninverting input 13 being connected to the junction between these two resistance components. The signal $e_1$ applied to the noninverting input 13 accordingly is the voltage across resistance $R_1$.

Figure 2:
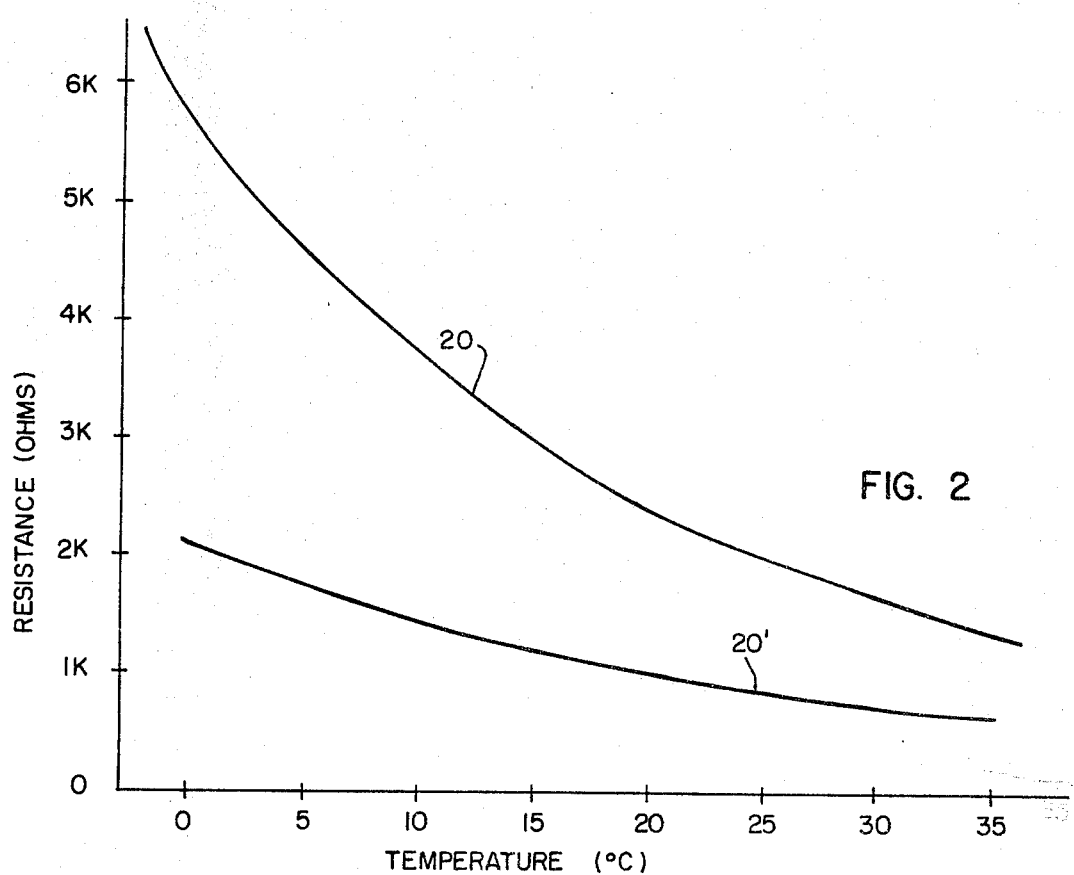
FIG. 2 are curves illustrating the resistance variation with temperature for particular resistance components of FIG. 1.

Both feedback paths are connected to a point of reference potential illustrated as ground and the circuit thus far described is typical of an astable or free running multivibrator, however, with one important distinction. In the circuit of FIG. 1, resistance $R_1$ is a resistance which varies non-linearly with temperature. Resistance $R_1$ includes a nonlinear resistance in the form of a thermistor $R_t$ which in a well-known manner experiences a resistance change which is non-linear with temperature. A typical characteristic curve for such a thermistor is illustrated by curve 20 of FIG. 2 wherein the vertical axis is plotted in kilohms and the horizontal axis in degrees Centigrade (celsius). The typical thermistor has a negative temperature coefficient so that its resistance decreases with increasing temperature, and vice versa. An off-the-shelf thermistor may be adapted to a particular frequency band of operation so as to provide a linear output, with the provision of a shunt resistor R which has the effect of modifying the curve to a desired shape. For example, curve 20 of FIG. 2 described thermistor $R_t$. With R chosen to be 2.5 kilohms, in parallel with thermistor $R_t$, the resulting resistance $R_1$ would have a characteristic as described by curve 20' of FIG. 2.

Figure 3A:
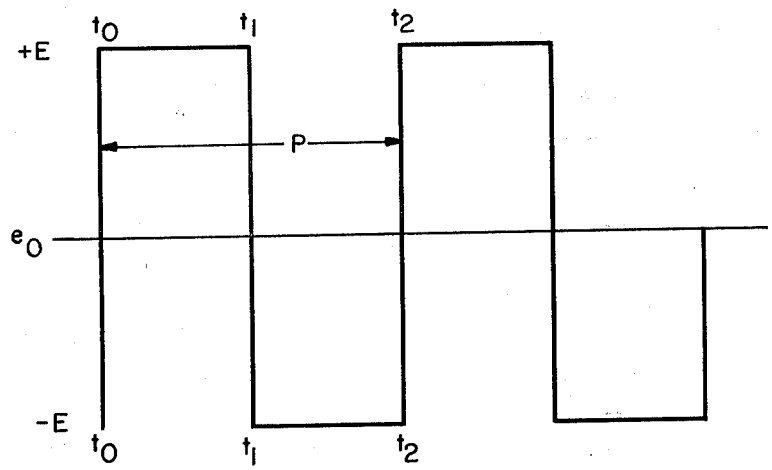
FIGS. 3A and 3B are voltage versus time waveforms to illustrate the operation of the circuit of FIG. 1.

Operational amplifier 10 is of the well-known type wherein the output $e_0$ will switch between saturation values +E and −E whenever the inputs to the amplifier are equal, or substantially equal. In a typical commercially available operational amplifier such switching will occur when the difference is fractions of a millivolt, which is the differential input voltage that produces saturation. Accordingly, the output $e_0$ is a square wave which switches between values +E and −E as illustrated by the waveform of FIG. 3A. The output $e_0$ has the positive saturation value +E from time $t_0$ to $t_1$ and has the negative saturation value −E from $t_1$ to $t_2$, the time from $t_0$ to $t_2$ constituting the period P. This square wave output is applied to the non-inverting input 13 by way of voltage divider $R_1$–$R_2$ and accordingly waveform $e_1$ is a replica of the output, as illustrated in FIG. 3B.

Figure 3B:
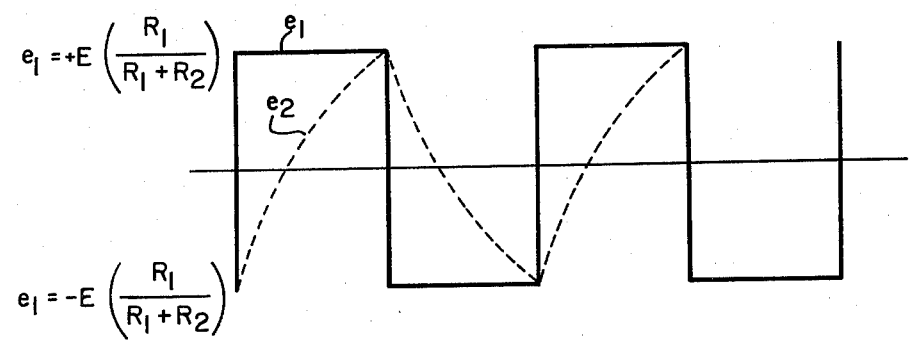

The square wave output is also applied to the inverting input 12 by way of an integrator circuit $R_3C$ and accordingly, the waveform $e_2$ as illustrated by the dotted line waveform of FIG. 3B is the integral of a square wave. From time $t_0$ to $t_1$ the voltage $e_2$ approaches that of $e_1$ and at time $t_1$ they are equal in magnitude thus causing a switching to the opposite state of amplifier 10 as can be seen by the waveform of FIG. 3A. The negative voltage fed back thus causes $e_1$ to reverse polarity and $e_2$ to reverse direction until $t_2$ at which time $e_1$ and $e_2$ are equal to again cause the switching of amplifier 10.

It may be shown that for equal positive and negative supply voltages $E$, the circuit will oscillate with a period $P$ of:

$$P = 2R_3 C \log_e \left( 2 \frac{R_1}{R_2} + 1 \right) \qquad \text{Eq (1)}$$

The period $P$ is a function of the value of resistance $R_1$, which in turn is indicative of temperature, and Equation 1 shows that the period is independent of power supply voltage and will remain such as long as the positive and negative power supply voltages are equal.

Equation 1 may be rewritten as:

$$\frac{P}{e^{2R_3 C}} = 2 \frac{R_1}{R_2} + 1 \qquad \text{Eq (2)}$$

$R_1$ in Equation 2 is the resistance value which changes non-linearly with temperature. As temperature increases, the value of $R_1$ in the right hand side of Equation 2 decreases in a non-linear way. The left hand side of Equation 2 must also decrease non-linearly and since $R_3$ and $C$ are constant, the value decreases non-linearly by a reduction of the value of $P$ in a linear manner. Thus, an increase of temperature results in a decrease in period $P$, but in a linear fashion. The same is true with a decrease in a temperature which results in an increase in period $P$ in a linear fashion.

Figure 4:
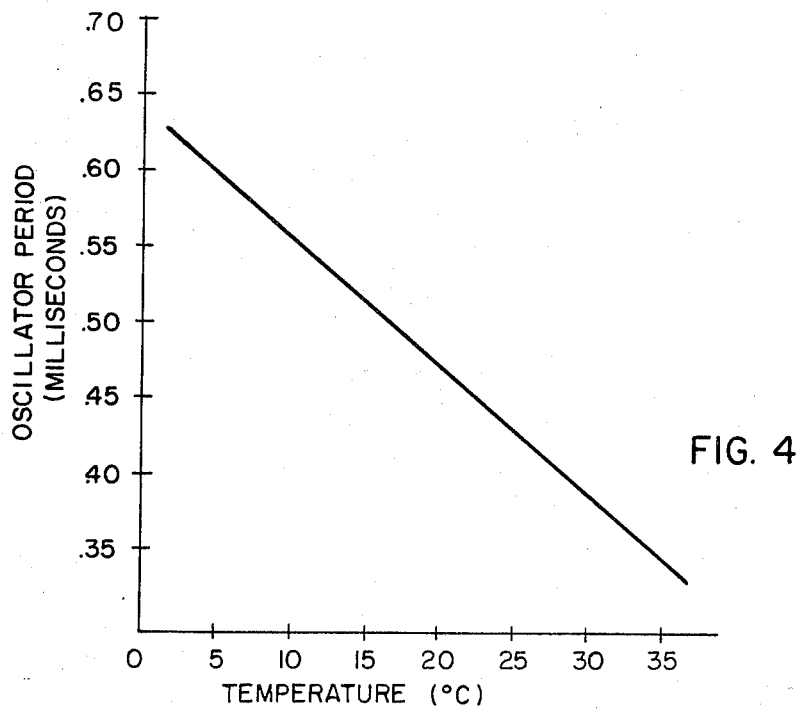
FIG. 4 is a curve illustrating the period of the output signal provided by the circuit in FIG. 1, as a function of temperature.

FIG. 4 illustrates for a particular circuit arrangement, the linear relationship between the period of the oscillator (plotted on the vertical scale) with respect to temperature, in degrees Centigrade (plotted on the horizontal scale). The relationship resulted from a circuit as described in FIG. 1 utilizing a Fenwal thermistor type GD32j92 shunted by a resistance $R$ of 2.5 kilohms. Resistance $R_2$ had a value of 20 kilohms as did resistance $R_3$ and capacitor $C$ had a value of 0.1 microfarads.

Since the period of the output signal $e_0$ varies linearly with the temperature measured by thermistor $R_t$, the output frequency (frequency = 1/period) may be determined to obtain an indication of temperature. Since the period (and/or frequency) is independent of signal amplitude, the oscillator is extremely useful for transmitting temperature information over long lines to a remote location where such transmission would ordinarily attenuate the transmitted signal. The temperature may be determined visually by an examination of the frequency-temperature relationship such as illustrated in FIG. 4, or may be determined automatically by means of a computer with a look-up table.

What is claimed is:

1. A linear period thermistor oscillator comprising:
   a. an amplifier including first and second inputs and an output and being of the type which provides an output signal which switches between relatively positive and negative output values depending upon the relative magnitude of signals applied to said first and second inputs;
   b. first and second feedback paths respectively connecting said output with said first and second inputs;
   c. said first feedback path including a circuit of the type which, in response to said output signal, provides a non-linear output signal, said non-linear output signal being applied to said first input;
   d. said second feedback path including a voltage divider network;
   e. a thermistor having a resistance which varies non-linearly with temperature, connected as an element in said voltage divider network.

2. Apparatus according to claim 1 wherein:
   a. said voltage divider network is connected between said output and a point of reference potential;
   b. said thermistor is connected in circuit between said point of reference potential and said second input.

3. Apparatus according to claim 2 wherein:
   a. the voltage across said thermistor is applied as the input signal to said second input.

4. Apparatus according to claim 1 which includes:
   a. a fixed resistance connected in parallel circuit configuration with said thermistor.

* * * * *